Figure 1:
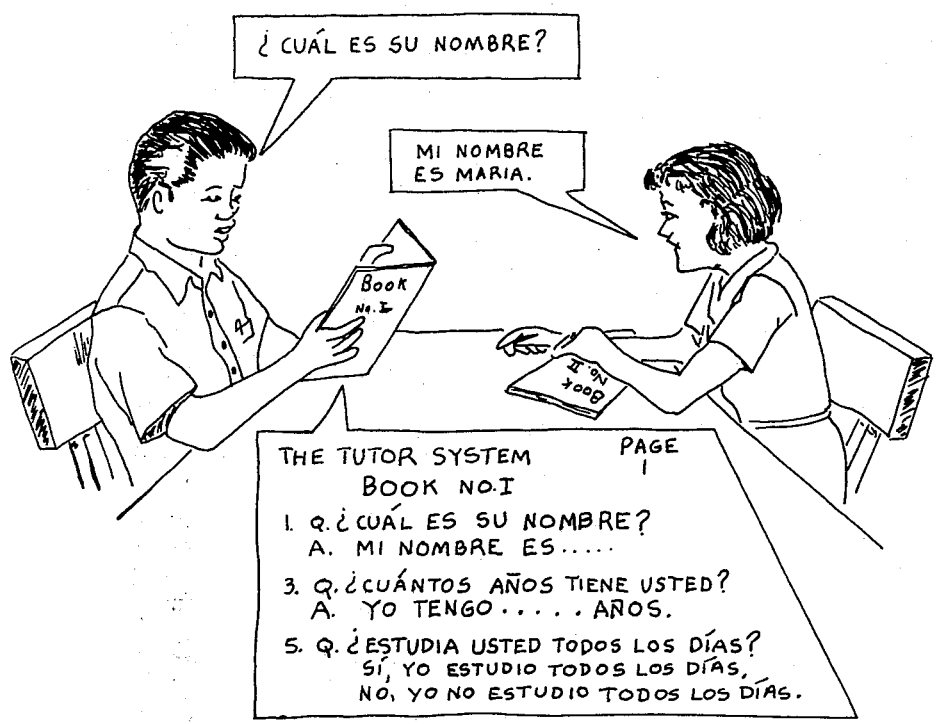

United States Patent [19]

Fernandez et al.

[11] 4,112,595
[45] Sep. 12, 1978

[54] TEACHING DEVICES

[76] Inventors: Santiago Julio Fernandez; Maria del Cármen Fernandez, both of Paseo & Portola, Palm Desert, Calif. 92260

[21] Appl. No.: 762,191

[22] Filed: Jan. 24, 1977

Related U.S. Application Data

[63] Continuation-in-part of Ser. No. 623,320, Oct. 17, 1975.

[51] Int. Cl.² .............................................. G09B 19/08
[52] U.S. Cl. ...................................................... 35/35 E
[58] Field of Search ..................... 35/35 R, 35 E, 35 J; 283/46

[56] References Cited

U.S. PATENT DOCUMENTS

| | | | |
|---|---|---|---|
| 1,271,856 | 7/1918 | Cook | 35/35 J X |
| 2,385,452 | 9/1945 | Lande | 35/35 R |
| 3,081,560 | 3/1963 | Agud | 35/35 R |
| 3,271,884 | 9/1966 | Roberson | 35/35 E |
| 3,744,154 | 7/1973 | Pott | 35/35 R |

FOREIGN PATENT DOCUMENTS

| | | | |
|---|---|---|---|
| 363,010 | 8/1962 | Switzerland | 35/35 R |
| 1,038,640 | 8/1966 | United Kingdom | 35/35 E |

*Primary Examiner*—Richard J. Apley

[57] ABSTRACT

The teaching device of our invention comprises two books —numbered I and II— each containing a plurality of questions in a given language. Each question is numbered and followed by an answer that serves as a model of the grammatical structure that should be used in answering them correctly. Book I contains questions successively numbered with odd numbers (1-3-5-7-9 . . .), and Book II contains questions successively numbered with even numbers (2-4-6-8-10 . . .). The questions are designed and coordinated so as to simulate a conversation. In use, two students are paired off, with one student using Book I and the other student using Book II. The student using Book I initiates the conversation by reading question #1 aloud to the other student who then answers the question without the help of any printed matter. This forces the student answering the question to develop his own response. Afterwards, it is his turn to read question #2 from Book II aloud. After the student using Book I answers question #2 without the help of any printed matter, it is his turn to ask question #3 to the student holding Book II, and so on. If one of the students fails to answer correctly, the other student teaches him now to answer correctly using the model answer that follows the question. This exchange of questions, answers, and tutoring provides the oral practice needed to develop the skills of speaking the target language fluently.

2 Claims, 2 Drawing Figures

TEACHING DEVICES

This application is a Continuation-in-part of our earlier filed application, Ser. No. 623,320, filed Oct. 17, 1975.

FIELD OF USE

This invention relates generally to teaching devices. In particular, it relates to a teaching device wherein questions are coordinated using two or more books in order to stimulate a conversation between two or more students as means of developing their speaking skills in a foreign language or in English.

DESCRIPTION OF PRIOR ART

Various types of teaching devices are available for teaching the grammar, pronunciation, reading, and writing of languages, but none has ever been successful in developing the skill of speaking the target language fluently. For this reason, students with a real desire to learn how to speak a foreign language have had to go to the country where that particular language is spoken in order to obtain the conversational practice necessary to develop their speaking skills; or else, they have had to contract the services of a personal tutor fluent in the target language.

It has been the practice, up to now, of printing all matters relevant to the teaching of a given language in a single book. Such books contain the grammar of the language, its basic vocabulary, repetition drills, plus narratives or short dialogues followed by a list of questions about their content. These questions are used by the teacher to obtain oral responses by the students — who must answer the question without the aid of printed answers — as a means of developing their skills of speech in the target language. However, due to the fact that the instructor must give his attention to no less than twenty students at a time, each student is limited to a few minutes, at best, of oral practice per class period — something which is totally inadequate in developing the speaking skills. Therefore, the use of a single book does not allow a conversational situation among students without the direct participation of the teacher.

Prior art discloses a teaching device wherein separate cards, containing questions and fixed answers in a foreign language, make it possible for one player to ask a question by reading from a card, said card having the question printed on it, and for another player to answer the question by reading the answer from his card, said card having the answer printed on it and being separate and distinct from the first card. Such cards allow the students participating in the game to develop their reading skills, but do not force the students to use their analytical and descriminatory powers in developing oral responses to the questions. The result obtained by the use of such prior art card games is merely a mechanical exchange of written words and sentences, as read by the students participating in the game. Such games require little or no skill beyond that of being able to read in a foreign language; and in fact, this too becomes unnecessary if the questions and answers are printed phonetically rather than as they actually appear in the language. This exchange of reading does not force the students to develop their own responses, and, therefore, contributes very little, if anything, to their development of the skills of speech in a foreign language.

Another disadvantage of some prior art teaching devices is that cards containing questions and answers are separable, and to use them a complicated set of rules must be followed; therefore they are difficult to manipulate, easily lost, subject to possible errors in their use, time consuming, and difficult to maintain in working order. All of these inconveniences render this type of device improper to be used in a classroom situation.

SUMMARY OF THE INVENTION

A teaching device in accordance with the present invention is particularly well adapted for teaching the skill of speaking foreign languages fluently. But it could be utilized as well to teach English, reading or any other subject besides languages.

A teaching device in accordance with the present invention comprises two books containing questions numbered successively and coordinated so as to simulate a conversation. Questions numbered with odd numbers (1-3-5-7-9- etc.) are printed in one book (I), and questions numbered with even numbers (2-4-6-8- etc.) are printed in the other book (II). Every question is followed by a clue that indicates the grammatical structure that should be used in answering it. The foregoing structurally arranged components constitute the language teaching device of our said invention, adapted to be used by two students in developing their speaking skills in the use of a foreign language without the need of a teacher or professional tutor.

The nature and scope of our present invention will be more fully understood from the following description taken in connection with the accompanying drawings forming part hereof, in which FIG. 1, is a plan view of two students in which the male student at the left is reading question number one (1) from his book (I) to a female student at the right. The girl is answering the question without the use of any printed help. In doing so, she must produce the answer using only her own knowledge and skills. In this respect the result obtained using the device of our invention is totally different to the result obtained using the device disclosed by Cook, in which the student reads the answer from a card as opposed to constructing her own answer. An enlargement of the page of the book from which the male student is reading the question allows us to see that the questions printed in that book are numbered with odd numbers (1-3-5-7- etc.), and that each question is followed by a clue that indicates the grammatical structure that should be used in order to answer the question correctly. This grammatical clue allows the student asking the question to check the correctness of the answer given by the other student but in no way limits the possible response. The student answering the question is not restricted to give a fixed answer — as is the case in Cook's card game — but rather is allow to express his-her thoughts. If the answer is not embodied in the correct grammatical structure, the student asking the question can correct the student giving the wrong answer, thus teaching him/her how to use the appropriate grammatical structure. The result obtained is very similar, if not identical, to what happens when a person is learning a foreign language from a personal tutor that is proficient in the speaking use of the target language. The use of the device of our invention allows any student to function as a competent instructor by using the clue that follows each question to teach his fellow student while, at the same time, he/her reinforces his/her own knowledge about the structure he/her is teaching.

Figure 2:
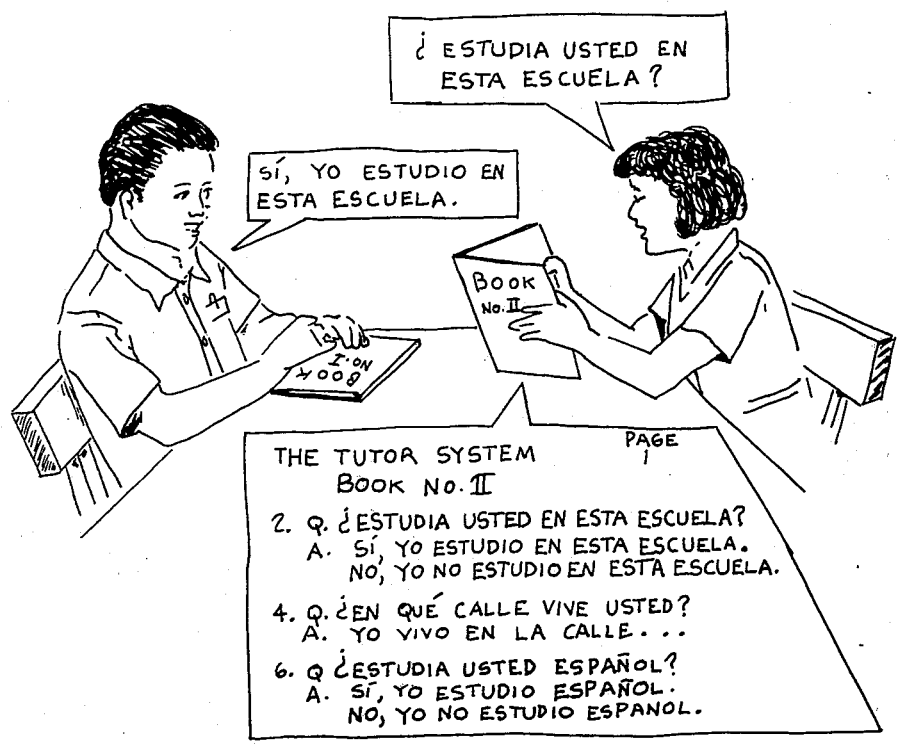

FIG. 2, represents the same two students represented in FIG. 1. This time the girl at the right is reading question number two (2) out of her book (II) to the boy at the left. The boy is answering the question without the use of any printed clue. An enlargement of the page from where the girl is reading the question permits us to see that the questions in Book II are numbered with even numbers (2-4-6-8- etc.), and are followed by a clue that will allow the girl to check the correctness of the answer given by the boy, and to teach him the appropriate grammatical structure he should use if he fails to answer correctly.

On the other hand, while the use of the book format allows us to compact into a single, highly practical package all the questions necessary to cover all the possible situations in which the target language can be used. Card Games as disclosed by prior art, seriously limit the number of questions that can be presented in a set of cards even if more than one question is written in each card. Another significant difference is the fact that card games require the manipulation of the cards in a special manner following a complicate set of rules, meanwhile the use of our device only requires that the students involved follow the normal numerical order in the exchange of questions. This difference make the formers inadequate to be used in a classroom situation, while ours is the ideal device to be use in a classroom situation.

The above description corresponds to a preferred arrangement of materials; however, it does not exclude the use of more than two books in order to allow three or more students to participate in the conversation.

The technique used in our teaching device of separating the questions with its clues into two or more books makes it possible:

(a) To coordinate the questions so as to force the students participating into a conversational situation.
(b) To individualize, to an ideal degree, the instruction of the target language by pairing the students in accordance with their abilities and level of development in the use of the target language.
(c) To provide intensive and extensive oral practice in developing the skills of speaking the target language without the intervention of the teacher.
(d) To develop the skill of thinking in the target language.

Besides the new and useful functions and results described above as the direct consequence of printing the questions and their clues in two different books, the device is simple and convenient to use, and has no detachable parts that can be misplaced, lost or improperly assembled, and it is not limited in the amount of material that can be covered by physical limitations.

I claim:

1. A language teaching device to be used by a plurality of users comprising, in combination, at least two distinct and unique books, each of said books comprising a plurality of bound sheets and containing a selected number of unique questions in the given language followed respectively by a grammatical clue indicating the grammatical structure that should be used in answering the question, said questions being followed respectively by at least a portion of its model answer in the given language to be elicited by the user receiving the question; the totality of questions being constituted by a sequentially numbered set, the sequence alternating between the respective user's books, the questions of each book being so designed and coordinated as to simulate a conversation.

2. The method of teaching a given language or subject to a plurality of users comprising the steps of:
    (a) providing each user with a distinct and unique book, wherein each book comprises a separate and distinct plurality of bound sheets and containing a selected number of question in the given language followed respectively by a grammatical clue indicating the grammatical structure that should be used in answering the question, said questions being followed respectively by at least a portion of a model answer in the given language, the totality of questions being constituted by a sequentially numbered set, the sequence alternating between the respective user's books, the questions of each book being so designed and coordinated as to simulate a conversation;
    (b) commencing with the user having the book with question number one, said user asking said question and eliciting an answer in the given language by the recipient thereof which is intended to conform to the model answer appearing with said question, said user utilizing the grammatical clue to insure the grammatical correctness of the recipient's answer;
    (c) proceding to the user having the book with question number two, said user asking said second question and eliciting an answer in the given language by the recipient thereof which is intended to conform to the model answer appearing with said second question, said user utilizing the grammatical clue to insure the grammatical correctness of the recipient's answer;
    (d) continuing this alternating pattern throughout the set.

* * * * *